May 26, 1942. H. C. FERGUSON 2,284,087
TEAPOT
Filed April 16, 1940
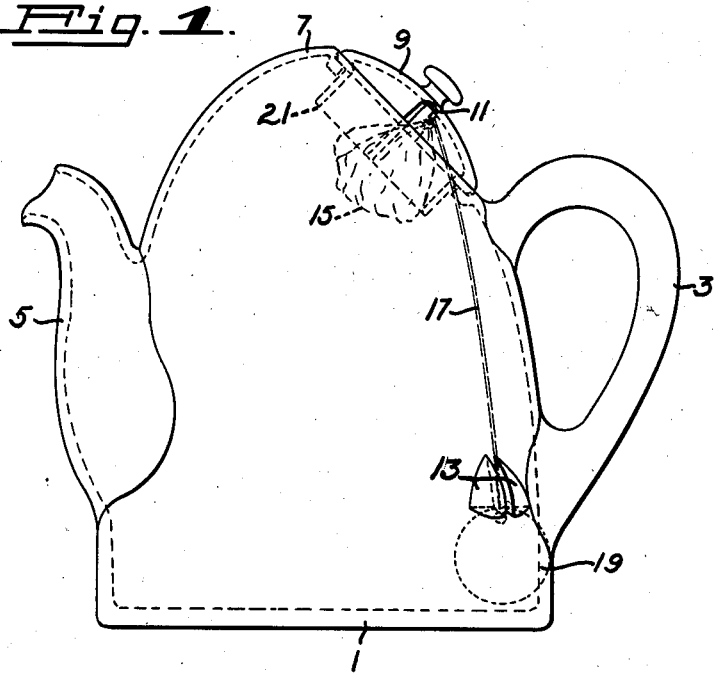
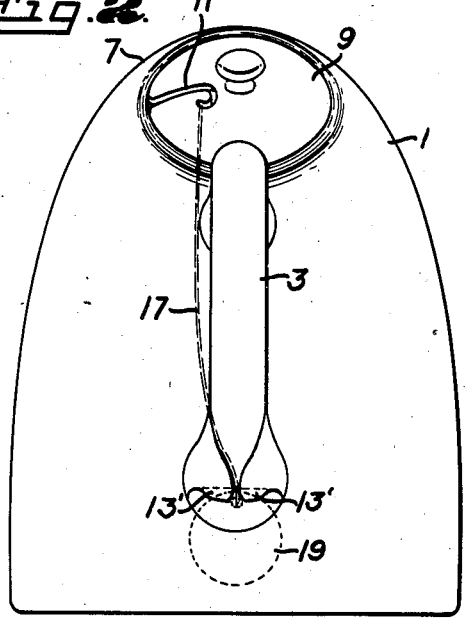
INVENTOR,
HENRY C. FERGUSON.
BY
ATTORNEYS.

Patented May 26, 1942

2,284,087

UNITED STATES PATENT OFFICE 2,284,087

TEAPOT

Henry C. Ferguson, San Francisco, Calif.

Application April 16, 1940, Serial No. 329,896

3 Claims. (Cl. 53—3)

This application relates to teapots, and particularly to teapots of small or medium size to be used in connection with tea bags in brewing the beverage.

Among the objects of my invention are: To provide a teapot in which tea may be brewed of the requisite strength to give the desired flavor and aroma, and the process of infusion can be stopped completely at any desired stage, without removing the tea bag from the pot where it presents the problem of disposal; to provide a teapot wherein two or more cups of tea can be prepared at one infusion, without the necessity of adding more water to partly spent tea leaves, thus providing a less satisfactory and aromatic brew and one bitter with tannin; to provide a teapot wherein the tea bag after its virtues have been exhausted may be drawn up within the cover of the teapot and held within the pot and out of sight, by the simplest possible means; and to provide a teapot wherein the exhausted tea bag with its string serve to hold the cover in place during pouring, obviating the necessity of using one hand for this purpose, and thus combining increased sightlessness with increased convenience.

Other objects of my invention will be apparent or will be specifically pointed out in the description forming a part of this specification, but I do not limit myself to the embodiment of the invention herein described, as various forms may be adopted within the scope of the claims.

Referring to the drawing:

Fig. 1 is a side elevation of a teapot embodying my invention.

Fig. 2 is a rear elevation of a teapot substantially similar to that shown in Fig. 1, but embodying a slight modification in the method of holding the tea bag in place after the tea is brewed.

Referring to Fig. 1, the teapot 1 is preferably made of earthenware, china, or other material having relatively low heat conductivity, although it may, of course, be made of plastic or even metal. The pot is provided with the usual handle 3 and, on the opposite side, a spout 5. It may, if desired, be made with the usual level top, but I prefer to make the top domed, as indicated by the reference character 7 with an aperture for the lid 9 positioned at an angle on the side of the dome toward the handle, so that when the pot rests upon its base as shown in the figure the lid, instead of being level, is at an angle of about forty-five degrees with the horizontal. Lid 9 is provided with a central knob 8.

Formed in the lid is a recurved arcuate slot 11, and near the bottom of the pot and preferably adjacent the handle is a catch formed of two closely spaced and slightly undercut lugs 13.

As stated above, the teapot is primarily designed for use with tea bags, which are now generally obtainable commercially. Such bags uniformly comprise a sac or envelope 15, of cheesecloth or other loosely woven material, to which is attached the cord 17 terminating in a cardboard tag 19 which serves not only as a handle for manipulating the bag but also as a label to carry suitable identification of the grade and variety of the tea in the bag.

In using the teapot here described in brewing tea, the tea bag is first placed in the pot, which has preferably previously been warmed, and boiling water is poured in of sufficient quantity to make, say, two cups of tea if the pot be for individual service. The cord 17 is threaded through the slot 11, and drawn back into the recurved tip of the slot, and the cover is then placed on the pot.

When the tea has brewed sufficiently the cord is used to pull the tea bag up against the cover, and within the flange 21 thereof if the cover be so constructed, as is preferable. The cord 17 is then passed between the two lugs 6 and the tag 19 is hooked beneath their undercut portion, thus holding the tea bag out of the brew. Such dripping as occurs from the tea bag then merely returns to the infusion, the flange 21 preventing it from oozing out from beneath the cover.

In case the tea bag cord 17 should be too long for the tea bag to be removed from the brew when the tag is caught beneath lugs 6, the lid of the teapot may be rotated. Due to the recurved tip of slot 11 the cord will be retained in the slot during the rotation of the lid and there will be no tendency of the cord to slip out as the lid is rotated. Such rotation will wind the cord at least partially around the lid knob 8 and tighten the cord, bringing the tea bag 15 close against the lid. Thus my invention may be used with tea bags of various makes which may have different length cords.

Owing to the slanted position of the cover there is little tendency for it to fall off during pouring, but even when this precaution is taken in the construction of the pot the tendency of the tea drinker to squeeze out the last drop may impel the tilting of the pot farther than is necessary, so that the lid would have a tendency to fall off and, probably, break the tea cup into which the beverage is being poured. This, however, cannot take place in the present instance, since the cord serves to anchor the lid in place and prevent it from tilting or falling, and it is effective for this purpose even where a flat-topped, un-domed pot is used.

The pot shown in the modification of Fig. 2 is essentially the same as that shown in Fig. 1, and the same reference characters are used to indicate the various parts. Since this view is taken from the rear, however, the shape of the preferred form of slot 11 is more clearly indicated. In this case, too, the lugs 13' are formed at the base of the handle, where they are protected from accidental chipping by the swell of the handle itself. Since it is quite customary to hold the pot by the handle when it is being washed this expedient for protecting the lugs from breakage is quite effective.

The exact form of the invention shown is primarily designed for an individual service in restaurants, tea rooms, and the like, and depicts the size and form satisfactory for two cups of tea, the tea as purveyed in the tea bags being customarily measured for a service of this amount. Larger bags are, however, made for family service and it is quite apparent that the invention may be used in a larger pot, in which case either the larger bags would be employed or two or more bags of the smaller size can be used and the tags of both bags hooked under the same catch.

I am aware that teapots have been made in the past with slotted or perforated covers for purposes similar to mine, but so far as I am aware these have all involved structures of some complexity, causing difficulties in cleaning properly or have manifested other disadvantages which have prevented their general public acceptance, whereas one of the principal advantages of my device is its utter simplicity.

I claim:

1. In combination, a teapot and a lid having an interior recess large enough to receive a tea bag, said lid having a radially extending slot provided with a terminal recurved portion therein extending laterally with respect to the radial direction of the slot, said slot adapted to permit the insertion of the cord of a tea bag through the peripheral edge of the slot, and a catch positioned on the lower portion of the teapot and adapted to retain a tag secured to said cord, comprising a projection having an intermediate slot for receiving the tag end of the cord, said recurved portion forming a retaining means for the cord, whereby the tag end may be locked in position in said intermediate slot and said lid may be rotated, to compensate at all times for unusual length of the cord and maintain the bag within the lid.

2. In combination a teapot having a lid, said lid having an unobstructed radial passage opening into its periphery at one end and at the other end communicating with a lateral extending recurved passage, the body of the teapot being provided with a fixed locking means for the tag end of a tea bag, said passageway adapted to receive the cord of the tea bag to normally support the bag adjacent the bottom of the teapot, and when said bag is withdrawn into the lid, and the tag end is engaged with said locking means, said recurved portion serves to constantly retain the bag within the lid, regardless of the position of the recurved portion with respect to said locking means and the length of the cord.

3. In a combination as recited in claim 2, wherein the lid is angularly disposed on said teapot.

HENRY C. FERGUSON.